United States Patent [19]

Esselborn et al.

[11] Patent Number: 4,868,262
[45] Date of Patent: Sep. 19, 1989

[54] COPOLYMERS WITH EPOXIDE GROUPS, THEIR SYNTHESIS AND USE FOR FINISHING TEXTILE FIBERS OR FIBER PRODUCTS

[75] Inventors: Eberhard Esselborn, Essen; Jurgen Fock, Dusseldorf, both of Fed. Rep. of Germany

[73] Assignee: Th. Goldschmidt AG, Essen, Fed. Rep. of Germany

[21] Appl. No.: 199,001

[22] Filed: May 26, 1988

[30] Foreign Application Priority Data

Jul. 15, 1987 [DE] Fed. Rep. of Germany ....... 3723355

[51] Int. Cl.[4] .............................................. C08F 24/00
[52] U.S. Cl. ..................................... 526/273; 526/318
[58] Field of Search .................................. 526/273, 318

[56] References Cited

U.S. PATENT DOCUMENTS

| | | | |
|---|---|---|---|
| 3,591,570 | 7/1971 | Gurgiolo et al. | 526/273 |
| 3,723,570 | 3/1973 | Adelman | 526/273 |
| 4,152,507 | 5/1979 | Yamamoto | 526/273 |
| 4,463,165 | 7/1984 | Englehardt et al. | 528/302 |

FOREIGN PATENT DOCUMENTS 2643637 4/1977 Fed. Rep. of Germany .
3244011 5/1984 Fed. Rep. of Germany .

*Primary Examiner*—Joseph L. Schofer
*Assistant Examiner*—Alex H. Walker
*Attorney, Agent, or Firm*—Toren, McGeady & Associates

[57] ABSTRACT

Copolymers having epoxide groups are disclosed which are obtained by the copolymerization of ($a_1$) one mole of a macromonomer of the general formula

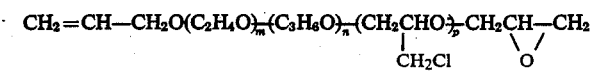

in which $m=5$ to 75, $n=0$ to 10 and $p=0$ to 3;

($a_2$) 2 to 12 moles of a vinyl ester of the general formula $CH_2=CHOCOR^1$, wherein $R^1$ is an alkyl group with 1 to 4 carbon atoms;

($a_3$) 0 to 6 moles of N-vinylpyrrolidone; and ($a_4$) 0 to 6 moles of an acrylate or methacrylate ester of the general formula $CH_2=CR^2—COOR^3$, wherein $R^2=H$ or $CH_3$, $R^3=$alkyl with 1 to 4 carbon atoms, the quotient formed from the average molecular weight of monomer ($a_1$) and the sum of the number of moles of the monomers ($a_2$), ($a_3$) and ($a_4$) being 20 to 500.

The invention moreover relates to the synthesis of these copolymers by copolymerization of appropriate comonomer mixture and to the use of the copolymers for finishing textile fibers or fiber products.

20 Claims, No Drawings

COPOLYMERS WITH EPOXIDE GROUPS, THEIR SYNTHESIS AND USE FOR FINISHING TEXTILE FIBERS OR FIBER PRODUCTS

FIELD OF THE INVENTION

The present invention relates generally to novel copolymers with epoxide groups, their synthesis and use for finishing textile fibers or fiber products. The invention is particularly directed to copolymers suitable for the permanent hydrophilic finishing of textile fibers or fiber products.

BACKGROUND INFORMATION AND PRIOR ART

It is well known that polymers may be applied to the surfaces of fibers or fiber products in order to change and enhance the properties of the fibers or fiber products in a desired manner. In particular, in such procedures, the fibers are to be hydrophilized in order to increase the wear comfort of articles of clothing produced from them. Furthermore, the soiling of the textiles, their electrostatic charge and other use properties are to be improved.

German Patent No. 26 43 637 discloses a method for finishing fiber products containing cellulose fibers with a synthetic resin. In this method, the fiber products are treated with a solution or dispersion of a glycidyl-containing copolymer, whereupon the products are dried and then heat treated in the presence of an acid catalyst, the heating being effected to a temperature sufficient to split the oxiran bond of the glycidyl group. The catalyst is incorporated in the solution or dispersion of the copolymer or is applied before or after the drying step in the form of a separate solution or dispersion. The method is characterized in that a copolymer is used, which comprises:

(a) 1 to 55 mole percent of at least one structure unit of the formula:

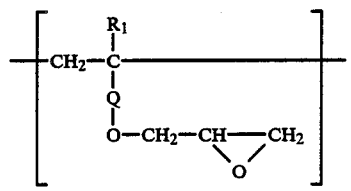

wherein
$R_1$ is a hydrogen atom or a methyl group and Q is CO or $CH_2$.

(b) 0.5 to 25 mole percent of at least one structure unit of the formula:

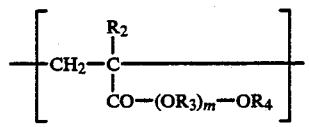

wherein
$R_2$ is a hydrogen atom or a methyl group;
$R_3$ is a linear or branched alkylene group with not more than 3 carbon atoms:
$R_4$ is a hydrogen atom, a linear or branched alkyl group, an acryloyl group or a methacryloyl group and m is a whole number from 5 to 25 and
(c) 98.5 to 20 mole percent of at least one structure unit of the formula:

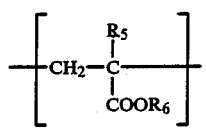

wherein
$R_5$ is a hydrogen atom or a methyl group and
$R_6$ is a linear or branched alkyl group or a hydroxyalkyl group, as well as optionally
(d) up to 10 mole percent of other vinyl-like structure units.

In the German Offenlegungsschrift 3,244,011, a water-dispersible polyester is described, which is built up from components of formula

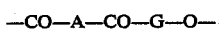

wherein
A represents, on the statistical average, 80 to 100 mole percent of p-phenylene and 0 to 20 mole percent of a bivalent group of the formula

and G represents, on the statistical average, 30 to 90 mole percent of linear or branched bivalent alkane groups with 3 to 6 carbon atoms, which may also be interrupted by 1 or 2 oxygen atoms, 10 to 30 mole percent of bivalent polyether groups with an average molecular weight of 1.000 to 3.000 and 0 to 50 mole percent of ethylene groups and R represents a linear or branched alkyl group or alkenyl group with 6 to 18 carbon atoms.

The dispersible polyester is intended to be used for the hydrophilization, the antistatic finishing and the soil release finishing of fiber materials, which consist completely or to a considerable extent of hydrophobic fibers.

However, the products used for the method of the German Pat. No. 2,643,637 have the disadvantage that the handle or "touch" of the textile material treated with them is undesirably hard. Moreover, the polymer on the fibers is saponified by the action of alkalis, so that the permanence, that is, the resistance to laundering of the finished textile material is insufficient.

Deficient permanence is also a disadvantage of a finish produced on the basis of a dispersible polyester of the German Offenlegungsschrift No. 3,244,011. This is due to the fact that the polyesters are not cross linked and can therefore easily be detached from the fibers by washing.

A material for the hydrophilic finishing of fibers or fiber products should fulfill the following conditions:

The wear comfort of the textiles should be increased owing to the fact that body moisture can be better dissipated through the fabric to the outside.

The finish should have the highest possible permanence and still have a hydrophilizing effect after a larger number of conventional washing processes.

The ability to soil the textiles should be reduced. It should also be easier to remove existing soil from the textiles.

Graying of white domestic laundry articles is to be reduced.

The electrostatic charge on the textiles should be diminished. The uptake of dust is also minimized in this manner.

OBJECT OF THE INVENTION

It is the primary object of the present invention to provide novel copolymers which are superiorly suitable for the hydrophilic finishing of fibers and fiber products and, at the same time, improve the soil release properties. These copolymers are to fulfill the requirements outlined above or at least come closer to them than do comparable products of the state of the art.

A further object is to provide such copolymers which provide permanence of the finish in order to maintain the desired effects even after repeated laundering and dry cleaning.

It is also an object of the invention to provide a simple method for preparing the novel copolymers.

A still further object of the invention is to provide a composition of the novel copolymers suitable for finishing fibers and fiber products.

Generally, it is an object of the invention to improve upon the art of fiber finishing.

SUMMARY OF THE INVENTION

Surprisingly, it has been ascertained that finishes with this combination of properties are achieved with novel copolymers which are obtained by the copolymerization of:

($a_1$) one mole of a macromonomer of the general formula $$CH_2=CH-CH_2O(C_2H_4O)_m-(C_3H_6O)_n-(CH_2CHO)_p-CH_2CH-CH_2$$
$$\phantom{XXXXXXXXXXXXXXXXXXXXXXXX}|\phantom{XXXX}\backslash\phantom{X}/$$
$$\phantom{XXXXXXXXXXXXXXXXXXXXXXXXXX}CH_2Cl\phantom{XX}O$$

wherein $m=5$ to 75, $n=0$ to 10 and $p=0$ to 3 with ($a_2$) 2 to 12 moles of a vinyl ester of the general formula $CH_2=CHOCOR^1$, wherein $R^1$ is an alkyl group with 1 to 4 carbon atoms, ($a_3$) 0 to 6 moles of N-vinylpyrrolidone, and ($a_4$) 0 to 6 moles of an acrylate or methacrylate ester of the general formula $CH_2=CR^2-COOR^3$, wherein $R^2=H$ or $CH_3$, $R^3=$alkyl with 1 to 4 carbon atoms, the quotient formed from the average molecular weight of monomer ($a_1$) and the sum of the number of moles of the monomers ($a_2$),($a_3$) and ($a_4$) being 20 to 500.

Monomer ($a_1$) is prepared in a known manner by the addition of ethylene oxide and, optionally, propylene oxide to allyl alcohol and the subsequent reaction with epichlorohydrin in the presence of a cationic catalyst, followed by the splitting off of hydrogen chloride with formation of the oxiran ring.

If ethylene oxide and propylene oxide are added to allyl alcohol, they may be added randomly (statistically) or in blocks.

Subscript m indicates the number of hydrophilizing oxyethylene units. Subscript m is a number from 5 to 75, preferably from 20 to 50.

Subscript n indicates the content of oxypropylene units and is a number from 0 to 10 and preferably from 0 to 6. The task of the optionally present oxypropylene units is to prevent the formation of crystalline regions in the monomer and ensures that the macromonomer ($a_1$) is present in liquid form. This is important especially if larger proportions of oxyethylene units are contained in the monomer. If the oxyethylene content is relatively low and does not exceed about 18 oxyethylene units, the oxypropylene units may be omitted.

Subscript p has a value from 0 to 3.

Monomer ($a_2$) is a vinyl ester of the general formula $CH=CHOCOR^1$, in which R1 is an alkyl group with 1 to 4 carbon atoms, preferably the methyl group.

Monomer ($a_3$) is N-vinylpyrrolidone.

Monomer ($a_4$), which optionally may be contained in the copolymer, is an acrylate or methacrylate ester of the general formula $CH=CR^2-COOR^3$. $R^2$ is hydrogen or the methyl group, preferably hydrogen. $R^3$ is an alkyl group with 1 to 4 carbon atoms, preferably the methyl group. Based on 1 mole of the monomer ($a_1$), the copolymer contains 2 to 12 moles and preferably 3 to 6 moles of monomer ($a_2$), optionally up to 6 moles and preferably 1.5 to 3 moles of monomer ($a_3$), and optionally up to 6 moles, but preferably 1.5 to 3 moles of monomer ($a_4$). The additional condition must be met that the quotient formed from the average molecular weight of monomer ($a_1$) and the sum of the number of moles of monomers ($a_2$),($a_3$) and ($a_4$) is 20 to 500 and preferably 40 to 200. If, for example, the average molecular weight of monomer ($a_1$) is 1,000 and 6 moles of monomer ($a_2$), 3 moles of monomer ($a_3$) and 3 moles of monomer ($a_4$) are used, the quotient is:

$$1000/6+3+3=83.3$$

The copolymer of the invention is a graft copolymer and has a comb-like structure, there being present oxiran groups at the ends of the side chains formed by monomer ($a_1$). The copolymer thus is reactive and can be cured on suitable substrates, such as textile fibers or fiber products. As a result of such a curing reaction, products with a relatively high cross-linking density are formed which bring about a high permanence of the finish.

To cross link the copolymers of the invention, hardeners are suitable which are known from the state of the art and are capable of reacting with oxiran groups. Especially suitable for this reaction are multivalent amines, multivalent amides, multihydric thioalcohols or inorganic or organic acids. Examples of such compounds are polyamines, such as ethlenediamine, diethylenetriamine, triethylenetetramine and their reaction products with diglycidyl ethers of bisphenol A; polyalkylene oxides with terminal amino groups; dicyandiamide; compounds containing mercapto groups; polyaminoimidazoline; perfluoroalkylcarboxylic acids, perfluoroalkylsulfonic acids; and inorganic acids.

Especially preferred as cross linkers are amines of the general formula $$R^4[(C_3H_6O)_aNH_2]_b \text{ or } R^4[(C_2H_4O)_aNH_2]_b$$

In this formula $R^4$ is a b-valent alcohol group, in which b is 2 or 3. Examples of such alcohol groups are ethylene glycol, propylene glycol, butanediol, glycerin or pentaerythritol, the hydrogen atom of the hydroxyl group being split off in each case. a is a number from 4 to 40. The period during which the material of the invention can be processed can be lengthened substantially if ammonium compounds and preferably their acetates are used, instead of the free amines.

Synthesis of the copolymers of the invention is effected by copolymerizing a comonomer mixture, comprising (a₁) one mole of a macromonomer of the general formula

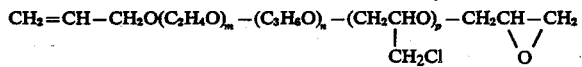

wherein m=5 to 75, n=0 to 10 and p=0 to 3;

(a₂) 2 to 12 moles of a vinyl ester of the general formula $CH_2=CHOCOR^1$, wherein $R^1$ is an alkyl group with 1 to 4 carbon atoms;

(a₃) 0 to 6 moles of N-vinylpyrrolidone;

(a₄) 0 to 6 moles of an acrylate or methacrylate ester of the general formula $CH_2=CR^2-COOR^3$, wherein $R^2$ is hydrogen or methyl, $R^3$ is an alkyl group with 1 to 4 carbon atoms, the quotient formed from the average molecular weight of monomer (a₁) and the sum of the number of moles of monomers (a₂),(a₃) and (a₄) being between 20 and 500, the copolymerization being carried out in the presence of free radical-forming initiators and in an organic solvent at temperatures of 60° to 100° C.

As initiators, free radical-forming compounds, such as peroxides or azo compounds, such as azodiisobutyric acid dinitrile may be used.

Alcohols, aromatic or aliphatic hydrocarbons, esters or ketones are suitable solvents. Ethanol or propanol are preferred.

The copolymers of the present invention are eminently suitable for finishing textile fibers or fiber products. With the novel copolymers, it is possible to fulfill the requirements as stated above for hydrophilic finishes for fibers or fiber products. The copolymers can be used to finish fibers or fiber products of cellulose (cotton) and synthetic fibers, such as those of polyesters, polyamides and polyacrylonitrile. The usability of the copolymers, however, is not limited to the aforementioned fibers.

The novel copolymers are advantageously applied on the fibers in the form of a liquid composition comprising between about 0.1 to 10% by weight of copolymer, with the remainder being water. For this purpose, the fibers or fiber products are dipped into the aqueous composition or impregnated therewith, and subsequently, dried and heated for 1 to 10 minutes to temperatures of 100° to 180° C., preferably of 120° to 150° C. The polymers on the fibers are cured during this heating.

The synthesis of the copolymers of the invention and their use properties are explained in greater detail in the following examples. In addition, the use properties of materials of the invention having different compositions are shown. The examples are given by way of illustration and not by way of limitation.

1. Synthesis of the Inventive Copolymers 1.1 Synthesis of Macromonomer (a₁)

Allyl alcohol (116 g. approx. 2 moles) and 21 g (approx. 0.3 moles) of potassium methylate are added to a reactor. After flushing carefully with pure nitrogen, the temperature is raised to 110° C. and 1333 g of ethylene oxide (approx. 30.3 moles) are added at such a rate that the temperature of the interior of the reactor does not exceed 120° C. and the pressure does not rise above 6 bar. After the introduction of the ethylene oxide is finished, the temperature is maintained at 115° C. until a constant pressure indicates that no further reaction is taking place. The unreacted monomers are then removed at 80° to 90° C. under vacuum.

The product obtained is neutralized with dilute phosphoric acid, the water is removed by distillation and the potassium phosphate formed by filtration with the help of a filter aid. The hydroxyl number of the product is 89.9; assuming a functionality of one, this corresponds to a molecular weight of 625. From the iodine number, it can be calculated that the double bond content is 96% of the theoretical value. The polyether obtained (625 g. approx. 1 mole) is mixed with 18 g of a 10.5% solution of boron trifluoride etherate in diethyl ether and the resultant mixture is heated to 60° C. Epichlorohydrin (185 g. approx 2 moles) is then added dropwise over a period of ½ hour and the reaction is subsequently completed by heating for a further 2 hours at 60° C. 54 g (approx. 1 mole) of sodium methylate, dissolved in 110 g of methanol, is then added at about 25° C. and reacted at this temperature for 2 hours.

After the removal of the volatile components of the reaction mixture by distillation, the sodium chloride formed is filtered off. The epoxide number of the product obtained in percent by weight of oxygen is 2.61 (polyether 1-A).

Polyethers 2-A to 7-A are produced in a similar manner. Their composition is given in Table 1.

TABLE 1

| Polyether No. | Ethylene Oxide Moles | Propylene Oxide Moles | Molecular Weight OH No. | Epoxide Number Percent by Weight of Oxygen |
|---|---|---|---|---|
| 1-A | 15.2 | — | 625 | 2.61 |
| 2-A | 8.8 | — | 440 | 3.76 |
| 3-A | 28.9 | — | 1310 | 1.20 |
| 4-A | 47.8 | — | 2090 | 0.76 |
| 5-A | 12.9 | 1.8 | 720 | 1.87 |
| 6-A | 24.5 | 3.3 | 1305 | 1.09 |
| 7-A | 72.3 | 8.6 | 3320 | 0.46 |

1.2 Copolymerization of Components (a₁),(a₂),(a₃) and (a₄)

Polyether 1-A (600 g. approx. 1 mole), dissolved in 1,700 g of ethanol, is heated under a stream of nitrogen to 80° C. in a 3-neck flask. A mixture of 516 g (approx. 6 moles) of vinyl acetate, 258 g (approx. 3 moles) of methyl acrylate and 333 g (approx. 3 moles) of N-vinylpyrrolidone is added over a period of 3.0 hours. Parallel to this addition, 53.8 g of azodiisobutyrodinitrile is added in 6 equal parts by weight over a period of 5 hours. The temperature is maintained for a further 8 hours at 80° C. Subsequently, the unreacted monomers are distilled off under vacuum. From the amount of monomers collected in a cold trap, it can be calculated that the polymerization yield is 99% of the theoretical, based on the monomer mixture. It can be calculated from the determination of the iodine number that approx. 75% of polyether 1-A has been consumed in the copolymerization. Gel permeation chromatography reveals that copolymer I has a numerical average molecular weight of approx. 4,000.

Copolymers II–VIII are synthesized in an analogous manner. Their composition is given in Table 2.

TABLE 2

| Copolymer of the Invention No. | Polyether No. | Vinyl Acetate Moles | N—Vinyl-pyrrolidone Moles | Methyl Acrylate Moles | Ratio |
|---|---|---|---|---|---|
| I | 1-A | 6 | 3 | 3 | 50.0 |
| II | 2-A | 6 | 3 | 3 | 34.5 |

TABLE 2-continued

| Copolymer of the Invention No. | Polyether No. | Vinyl Acetate Moles | N—Vinylpyrrolidone Moles | Methyl Acrylate Moles | Ratio |
|---|---|---|---|---|---|
| III | 3-A | 6 | 3 | 3 | 107.0 |
| IV | 4-A | 6 | 3 | 3 | 172.0 |
| V | 4-A | 3 | 1.5 | 1.5 | 344.0 |
| VI | 5-A | 6 | 3 | 3 | 57.9 |
| VII | 6-A | 6 | 3 | 3 | 107.7 |
| VIII | 7-A | 4 | 3 | — | 474.3 |

2. Cross Linking Agents

The following are used as cross linking agents (Table 3):

TABLE 3

1-C: triethylenetetramine
2-C: reaction product of 2 moles of ethylene diamine and the diglycidyl ether of bisphenol A
3-C $\alpha,\omega$-diaminopolypropylene oxide (MW=400)
4-C: $\alpha,\omega$-triaminopolypropylene oxide (MW=400)
5-C: $\alpha,\omega$-diaminopolypropylene oxide (MW=400) reacted in a molar ratio of 1 : 2 with acetic acid
6-C: dicyandiamide +1% triethylenediamine
7C: polyfunctional sulfhydryl compound, commercially available from the Schering Company under the name of XE 90
8-C: polyaminoimidazolin, commercially available from the Schering Company under the name of Versamid 140
9-C: trifluoroacetic acid
10-C: trifluoromethanesulfonic acid
11-C: phosphoric acid 3. Testing the Application Properties of the Polymers of the Invention The copolymers are mixed with hardener and dissolved in water. The composition of the copolymer/hardener mixture is given in Table 4.

TABLE 4

| Agent | Copolymer of the Invention* | | Cross Linker** | |
|---|---|---|---|---|
| | No. | Wt. % | No. | Wt. % |
| 1 | I | 88.2 | 2 | 11.8 |
| 2 | I | 89.5 | 7 | 10.5 |
| 3 | I | 94.7 | 8 | 5.3 |
| 4 | I | 97.6 | 6 | 2.4 |
| 5 | II | 86.7 | 2 | 13.3 |
| 6 | III | 98.6 | 1 | 1.4 |
| 7 | IV | 96.1 | 4 | 3.9 |
| 8 | V | 95.3 | 4 | 4.7 |
| 9 | VI | 86.6 | 4 | 13.4 |
| 10 | VII | 91.7 | 4 | 8.3 |
| 11 | VIII | 96.3 | 4 | 3.7 |

*see Table 2
**see Table 3

3.1 Determining the Hydrophilicity 3.1.1 Droplet Test

The mixtures described in Table 4 are dissolved in water to form 5% solutions, in which strips of a polyester fabric with an area of 450 mm×230 mm and an area weight of 48 g/m² are saturated and then padded so that the wet weight corresponds approximately to twice the dry weight of the fabric. The samples are then dried for ten minutes at 140° C. in a forced-air oven, during which time the hydrophilizing agent is caused to react. Finally, the add-on weight is determined which usually is about 5% by weight.

After the hydrophilizing agent is applied, the material sample is stretched on two sides without folds on a stainless steel frame with the help of two rows of needles. 0.05 mL of water in the form of droplets is applied from a burette on the fabric, whereupon the time required by the drops to wet the fabric completely is measured with a stopwatch.

3.1.2 Determination of the Sorptive Capacity (Rise Height)

The material samples, obtained as described in 3.1.1. are tested according to the instructions of DIN 53 924. The sorptive capacity of the textile material is based on its ability to transport liquid by capillary forces against the force of gravity. In this test, the rise height of the liquid is taken as a measure of the sorptive capacity of the material.

For the test, strips of material are placed in a vessel with one end of the strips dipping into water. The height to which the liquid rises after one minute is then measured with a ruler.

3.2 Determination of the Permanence of the Hydrophilic Finish 3.2.1 By Soxhlet Extraction The samples of material obtained as described in 3.1.1. are extracted with distilled water for 18 hours in a soxhlet apparatus. The permanence P is calculated by determining the weight of the sample of material before (A) and after (B) the extraction, using the following equation $P - B/A \times 100$ [6% by weight]

3.2 2 By Laundering

The samples of material obtained as described in 3.1.1 are washed five times in a drum washing machine using a normal hot cycle at 60° C. The permanence is calculated as in 3.2.1.

3.3 Determination of the Soil-Release Properties

The soil-release test is intended to provide information concerning the ability to wash out contamination or soiling from the domestic area under household conditions. For this purpose, the same amounts of
 used engine oil
 grape juice
 coffee
were applied on the samples of material as representatives of many types of soil. After a period of 60 minutes, the samples of material were washed in a drum washing machine using the normal, hot program or cycle at 60° C. To evaluate the cleaning effect, the dried samples of material were compared under overhead lighting conditions with the AAT CC 130–1970 photographic standard and given a grade of 1 to 5, grade 1 signifying complete spot removal and grade 5 complete retention.

3.4 Evaluation of the Handle (Touch)

The treated textile fabric must have a pleasant handle and smoothness. However, there are no objective scales for evaluating the handle of fabric. As a criterion for the evaluation, however, it is possible to use the softness in contrast to the stiffness and the surface smoothness of a fabric. The classification of the handle into the categories of very soft, soft and hard is not free of subjective influences.

TABLE 6

| | | | Application Tests | | Soil Release[2] | | | |
|---|---|---|---|---|---|---|---|---|
| | Hydrophilicity | | Permanence | | | | | |
| Agent | Droplet Test [sec] | Rise Height[1] [mm] | After Extraction [% by wt.] | After 5 Washings [% by wt.] | Coffee | Black Grape Juice | Used Engine Oil | Handle[2] |
| 1 | 18 | 2 | 62 | 48 | 1 | 3 | 3 | 3 |
| 2 | 4 | 18 | 48 | 36 | 1 | 4 | 2 | 3 |
| 3 | 5 | 16 | 50 | 43 | 1 | 3 | 2 | 3 |
| 4 | 7 | 12 | 40 | 33 | 1 | 3 | 2 | 3 |
| 5 | 22 | 1 | 68 | 58 | 1 | 3 | 3 | 3 |
| 6 | 4 | 20 | 40 | 35 | 1 | 3 | 2 | 2 |
| 7 | 2 | 26 | 35 | 29 | 1 | 2 | 2 | 3 |
| 8 | 2 | 27 | 75 | 68 | 1 | 2 | 2 | 3 |
| 9 | 3 | 22 | 76 | 70 | 1 | 2 | 2 | 3 |
| 10 | 4 | 25 | 65 | 62 | 1 | 2 | 2 | 2 |
| 11 | 2 | 26 | 60 | 55 | 1 | 2 | 2 | 2 |
| Untreated Fabric | >120 | 0 | — | — | 2 | 3 | 6 | 2 |

[1] After the first minute
[2] Evaluation:
1 = very good, complete removal
2 = good, slight residues
3 = satisfactory, slight spot
4 = satisfactory, distinct spot
5 = hardly any cleaning effect
6 = unchanged
[3] 1 = very soft
2 = soft
3 = average
4 = hard

What is claimed is:

1. A copolymer with epoxide groups obtained by copolymerization of
   (a1) one mole of a macromonomer of the general formula

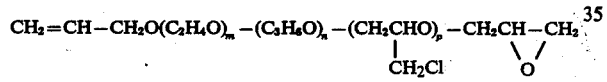

wherein m=5 to 75, n=0 to 10 and p=0 to 3;
   (a2) 2 to 12 moles of a vinyl ester of the general formula $CH_2=CHOCOR^1$, wherein $R^1$ is alkyl with 1 to 4 carbon atoms;
   (a3) 0 to 6 moles of N-vinylpyrrolidone, and
   (a4) 0 to 6 moles of an acrylate or methacrylate ester of the general formula $CH_2=CR^2-COOR^3$, wherein $R^2=H$ or $CH_3$, $R^3=$alkyl with 1 to 4 carbon atoms, the quotient formed from the average molecular weight of monomer (a1) and the sum of the number of moles of the monomers (a2),(a3) and (a4) being 20 to 500.

2. A copolymer as claimed in claim 1, wherein monomer (a1) is obtained by the addition of ethylene oxide to allyl alcohol, subsequent reaction with epichlorohydrin in the presence of a cationic catalyst and splitting off of hydrogen chloride with formation of the oxiran ring.

3. A copolymer as claimed in claim 1, wherein monomer (a1) is obtained by the addition of ethylene oxide and propylene oxide to allyl alcohol, subsequent reaction with epichlorohydrin in the presence of a cationic catalyst and splitting off of hydrogen chloride with formation of the oxiran ring.

4. A copolymer as claimed in claim 3, wherein said addition to allyl alcohol is effected statistically or block-wise.

5. A copolymer as claimed in claim 1, wherein the subscript m of (a1) has a value of 20 to 50.

6. A copolymer as claimed in claim 1, wherein the subscript n of (a1) has a value of 0 to 6.

7. A copolymer as claimed in claim 1, wherein the copolymer is liquid and (a1) contains at the most 18 oxyethylene units.

8. A copolymer as claimed in claim 1, wherein said alkyl of (a2) is methyl.

9. A copolymer as claimed in claim 1, wherein $R^3$ of a4 is methyl.

10. A copolymer as claimed in claim 1, wherein 3 to 6 moles of monomer (a2) are contained in the mixture from which the copolymer is formed.

11. A copolymer as claimed in claim 1, wherein 1.5 to 3 moles of monomer (a3) are contained in the mixture from which the copolymer is formed.

12. A copolymer as claimed in claim 1, wherein 1.5 to 3 moles of monomer (a4) are contained in the mixture from which the copolymer is formed.

13. A copolymer as claimed in claim 1, wherein said quotient is between 40 and 200.

14. A copolymer as claimed in claim 1, wherein the copolymer is cross-linked with a hardener capable of reacting with oxiran groups.

15. A copolymer as claimed in claim 14, wherein the copolymer is cross-linked with a member selected from the group consisting of multivalent amines, multivalent amides, multihydric alcohols, inorganic acids and organic acids.

16. A copolymer as claimed in claim 14, wherein the copolymer is cross-linked with $R^4[(C_3H_6O)_aNH_2]_b$ or $R^4[(C_2H_4O)_aNH_2]_b$, wherein $R^4$ is a b-valent alcohol, b being 2 or 3, and a=4–40.

17. A liquid composition suitable for finishing fibers and fiber products comprising about 0.1 to 10% by weight of the copolymer of claim 1 with the remainder being water.

18. A method for the synthesis of a copolymer of
   (a1) one mole of a macromonomer of the general formula

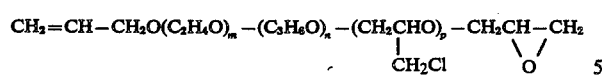

wherein m=5 to 75, n=0 to 10 and p=0 to 3;

(a₂) 2 to 12 moles of a vinyl ester of the general formula $CH_2=CHOCOR^1$, wherein $R^1$ is alkyl with 1 to 4 carbon atoms;

(a₃) 0 to 6 moles of N-vinylpyrrolidone; and (a₄) 0 to 6 moles of acrylate or methacrylate ester of the general formula $CH_2=CR^2-COOR^3$, wherein $R^2$=H or $CH_3$, $R^3$=alkyl with 1 to 4 carbon atoms, the quotient formed from the average molecular weight of monomer (a₁) and the sum of the number of moles of the monomers (a₂),(a₃) and (a₄) being 20 to 500;

said method comprising copolymerizing a monomer mixture of (a₁) one mole of a macromonomer of the general formula

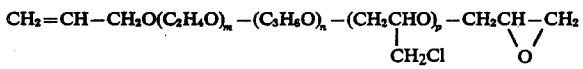

wherein m=5 to 75, n=0 to 10 and p=0 to 3;

(a₂) 2 to 12 moles of a vinyl ester of the general formula $CH_2=CHOCOR^1$, wherein $R^1$ is alkyl with 1 to 4 carbon atoms;

(a₃) 0 to 6 moles of N-vinylpyrrolidone; and (a₄) 0 to 6 moles of an acrylate or methacrylate ester of the general formula $CH_2=CR^2-COOR^3$, wherein $R^2$ is hydrogen or methyl, $R^3$ is alkyl with 1 to 4 carbon atoms, the quotient of the average molecular weight of monomer (a₁) and the sum of the number of moles of monomers (a₂),(a₃) and (a₄) being between 20 and 500;

said copolymerization being carried out in the presence of a radical-forming initiator and in an organic solvent at temperatures between about 60° to 100° C.

19. A method as claimed in claim 18, wherein said radical-forming initiator is a peroxide or an azo compound.

20. A method as claimed in claim 18, wherein said organic solvent is selected from the group consisting of alcohol, aromatic hydrocarbons, aliphatic hydrocarbons, esters and ketones.

* * * * *